US006310110B1

(12) United States Patent
Markowitz et al.

(10) Patent No.: US 6,310,110 B1
(45) Date of Patent: Oct. 30, 2001

(54) MOLECULARLY-IMPRINTED MATERIAL MADE BY TEMPLATE-DIRECTED SYNTHESIS

(76) Inventors: Michael A. Markowitz, 5408 Midship Ct., Burke, VA (US) 22015; Paul E. Schoen, 5006 Taney Ave., Alexandria, VA (US) 22304; Bruce P. Gaber, 5707 Northfield Rd., Bethesda, MD (US) 20817; Banahalli R. Ratna, 1619 Heron Way, Woodbridge, VA (US) 22191; Paul R. Kust, 4 Point Ave., Newark, DE (US) 19711-7478; David C. Turner, 12159 Travertine Trail, Jacksonville, FL (US) 32223; Douglas S. Clark, 163 Crestview Dr., Orinda, CA (US) 94563; Jonathan S. Dordick, 848 Greenthorne Blvd., Schenectady, NY (US) 12303

( * ) Notice: Subject to any disclaimer, the term of this patent is extended or adjusted under 35 U.S.C. 154(b) by 0 days.

(21) Appl. No.: 09/363,819

(22) Filed: Jul. 30, 1999

(51) Int. Cl.$^7$ ............................. C01B 33/12; C01B 37/02
(52) U.S. Cl. ......................... 521/99; 521/100; 521/102; 521/106; 521/107; 521/108; 521/109.1; 521/110; 521/111; 521/117; 521/120; 521/121; 521/128; 521/131; 521/154; 436/518; 436/524; 436/527; 436/531; 436/8; 501/12; 501/32; 501/80; 516/98; 516/99; 252/408.1; 210/656; 210/660; 210/661; 210/663
(58) Field of Search .................... 521/99, 100, 102, 521/106, 107, 108, 109, 110, 111, 117, 120, 121, 128, 131, 154; 436/518, 524, 527, 531, 8; 501/12, 32, 80; 516/98, 99; 252/408.1; 210/656, 660, 661, 663

(56) References Cited

U.S. PATENT DOCUMENTS

| | | | |
|---|---|---|---|
| 5,110,833 | * | 5/1992 | Mosbach ............................... 521/50 |
| 5,209,998 | | 5/1993 | Kavassalis et al. ................... 430/106 |
| 5,250,282 | | 10/1993 | Kresge et al. ....................... 423/705 |
| 5,304,363 | | 4/1994 | Beck et al. ......................... 423/328.1 |
| 5,310,648 | | 5/1994 | Arnold et al. ........................... 435/5 |
| 5,461,175 | | 10/1995 | Fischer et al. ....................... 564/304 |
| 5,538,710 | | 7/1996 | Guo et al. ............................ 423/701 |
| 5,622,684 | * | 4/1997 | Pinnavaia et al. .................... 423/702 |
| 5,630,978 | | 5/1997 | Domb .................................. 264/330 |
| 5,728,296 | | 3/1998 | Hjert´´n et al. .................... 210/198.2 |
| 5,756,717 | | 5/1998 | Paliwal et al. ..................... 536/123.1 |
| 5,795,559 | | 8/1998 | Pinnavaia et al. .................... 423/702 |
| 5,814,223 | | 9/1998 | Hjertén et al. ....................... 210/635 |
| 5,821,311 | | 10/1998 | Mosbach et al. ..................... 526/201 |
| 5,872,198 | * | 2/1999 | Mosbach et al. ..................... 526/201 |

OTHER PUBLICATIONS

Mosbach, K. et al, "The Emerging Technique of Molecular imprinting and Its Future Impact on Biotechnology", Biotechnology, vol. 14, Feb. 1996, pp. 163–170.
G. Wulff, "Molecular Imprinting in Cross–Linked Materials with the Aid of Molecular Templates—A Way towards Artificial Antibodies"Angew. Chem. Intl. Ed. Engl., 34, 1812–1832 (1995).
Wulff. G. et al, "Enzyme models Based on Molecularly Imprinted Polymers with Strong Esterase Activity" Angew. Chem. Int. Ed. Engl., 36 1962 (1997).
Lindberg et al, "Preparation of Silica Particles Utilizing the Sol–Gel and the Emulsion–Gel Processes" Colloids and Surfaces A 99, 79 (1995).
W. Stober et al, "Controlled Growth of Monodisperse Silica Spheres in the Micron Size Range" J. Colloid Interface Sci., 26, 62 (1996).
J. C. Vartuli, et al, "Effect of Surfactant/Silica Molar ratios on the Formation of Mesoporous Molecular Sieves: Inorganic Mimicry of Surfactant Liquid–Crystal Phases and Mechanistic Implications" Chemistry of Materials, 6, 2317 2326 (1994).
Markowitz et al, "Surface Acidity and Basicity of Functionalized Silica Particles" Colloids and Surfaces A: Physicochem Eng. Aspects 150, 85–94 (1999).
Davis et al, "Rational Catalyst Design via Imprinted Nanostructured Materials" Chem. Mater. 8 (1996) pp 1820–1839.

* cited by examiner

Primary Examiner—Nathan M. Nutter

(57) ABSTRACT

A method of making a molecularly imprinted porous structure makes use of a surfactant analog of the molecule to be imprinted that has the imprint molecule portion serving as the surfactant headgroup. The surfactant analog is allowed to self-assemble in a mixture to create at least one supramolecular structure having exposed imprint groups. The imprinted porous structure is formed by adding reactive monomers to the mixture and allowing the monomers to polymerize, with the supramolecular structure serving as a template. The resulting solid structure has a shape that is complementary to the shape of the supramolecular structure and has cavities that are the mirror image of the imprint group. Similarly, molecularly imprinted particles may be made by using the surfactant to create a water-in-oil microemulsion wherein the imprint groups are exposed to the water phase. When reactive monomers are allowed to polymerize in the water phase to form particles, the surface of the particles have cavities that are the mirror image of the imprint group.

15 Claims, 2 Drawing Sheets

MOLECULARLY-IMPRINTED MATERIAL MADE BY TEMPLATE-DIRECTED SYNTHESIS

BACKGROUND OF THE INVENTION

1. Field of the Invention

The invention relates generally to molecularly-imprinted material and in particular to molecularly-imprinted material made by template-directed synthesis.

2. Description of the Related Art

Enzymes are commonly exploited for practical uses, including as catalysts in synthetic processes, as detection reagents in chemical and biological sensors, and as catalysts in decontamination of environmental pollutants and other toxic agents. Their usefulness is largely due to their exquisite functional selectivity and regio- and stereospecificity. However, the usefulness of enzymes for practical purposes is limited by their intolerance to harsh conditions, particularly to conditions involving nonaqueous environments, temperature extremes, or the presence of materials that are toxic to the enzyme. In addition, enzymes may have a short shelf-life under ambient conditions and may require refrigerated storage to remain active.

Similarly, antibodies are useful for practical purposes such as for detecting or separating specific materials in complex mixtures. As with enzymes, the usefulness of antibodies is due to their functional selectivity and regio- and stereospecificity. Also, as with enzymes, their usefulness is limited by their intolerance for harsh conditions.

As a result of the difficulties in exploiting enzymes and antibodies on a large scale and in harsh environments, efforts have been made to develop enzyme and antibody mimics, that is, materials that can function as enzymes or antibodies, but which have a more durable composition. Specifically, efforts have been made to utilize the principles of molecular recognition to create artificial enzyme active sites or antibody binding sites through molecular imprinting of enzyme transition state analogs or antibody antigens in polymers and inorganic matrices. For example, molecularly printed materials are described in the following patents and publications incorporated herein by reference: U.S. Pat. No. 5,110,833 to Mosbach; U.S. Pat. No. 5,310,648 to Arnold et al; U.S. Pat. No. 5,372,719 to Afeyan et al; U.S. Pat. No. 5,453,199 to Afeyan et al; U.S. Pat. No. 5,461,175 to Fischer et al; U.S. Pat. No. 5,587,273 to Yan et al; U.S. Pat. No. 5,630,978 to Domb; U.S. Pat. No. 5,641,539 to Afeyan et al; U.S. Pat. No. 5,728,296 to Hjertén et al; U.S. Pat. No. 5,750,065 to Kilbane II; U.S. Pat. No. 5,756,717 to Paliwal et al; U.S. Pat. No. 5,786,428 to Arnold et al; U.S. Pat. No. 5,814,223 to Hjertén et al; U.S. Pat. No. 5,821,311 to Mosbach et al; U.S. Pat. No. 5,858,296 to Domb; U.S. Pat. No. 5,872,198 to Mosbach et al.; Mosbach, K. et al, "The Emerging Technique of Molecular imprinting and Its Future Impact on Biotechnology", Biotechnology, vol 14, February 1996, pp 163–170; G. Wulff, "Molecular Imprinting in Cross-Linked Materials with the Aid of Molecular Templates—A Way towards Artificial Antibodies" Angew. Chem. Intl. Ed. Engl., 34, 1812–1832 (1995); P. Hollinger, et al., "Mimicking Nature and Beyond" Trends in Biochemistry, 13(1), 79 (1995); Haupt, K., Mosbach, K. *Trends Biotech*, 16, 468–475 (1997); Davis et al, "Rational Catalyst Design via Imprinted Nanostructured Materials" Chem. Mater. 8 (1996) pp 1820–1839. and Wulff. G. et al, "Enzyme models Based on Molecularly Imprinted Polymers with Strong Esterase Activity" Angew. Chem. Int. Ed. Engl., 36 1962 (1997).

During a typical imprinting process, a molecule to be imprinted is combined with a mixture of functionalized and non-functionalized monomers so that the monomers surround the molecule to be imprinted. In the process, functionalized monomers align themselves in a binding relationship to complementary functional groups on the imprint molecule. The monomers are then polymerized, thereby encasing the imprint molecule within the polymer. The imprint molecule is then washed away, and the resulting material contains imprinted binding sites which are the "negative" of the imprint molecule. The complementary binding groups, arising from the functionalized polymer groups incorporated during the imprinting, are specifically positioned to enhance the preferential substrate binding and, if desired, subsequent catalysis.

To date, the methods of molecular imprinting described above have achieved only modest success in producing imprinted materials that exhibit selectivity and catalytic activity. The reason for this is that in order to be effective in wide scale use, antibody and enzyme mimics must have binding/active sites that are nearly homogeneous (in specificity and activity), well formed (based on shape and reactivity), and easily accessed by reactant molecules (access is affected by shape, size and polarity of the channels leading to the catalytic site). Site homogeneity and site accessibility are both equally important. The imprinted sites created by currently known methods are generally not very accessible and are generally not homogeneous, that is, they often have different binding affinities and/or reactivities. These problems arise from the methods used in forming the polymer imprint and providing access to the binding sites. Using the conventional imprinting process, the imprinted sites are completely encased within the polymer. In order to enable access to the sites, the polymer may be ground up, thereby exposing the sites. However, doing so causes the deformation of a large number of the binding sites and irreversibly alters the shape-specificity and the complementary binding of the sites, thereby adversely affecting their selectivity and activity. In an alternative method of enabling access to the imprinted sites, porogens (typically inert solvents) may be incorporated among the polymerizable monomers in the imprinting process. After polymerization, the porogens are washed away, creating pores that allow access to the binding sites. However, as the porogens are removed, some of the structural integrity of the polymer is lost, leading to deformation of the sites. The resultant loss in specificity and activity is similar to that observed as a result of grinding up the polymer.

Recently, efforts have been made to improve accessibility by creating imprinted sites on silica or polymer surfaces. In general, this approach involves linking complementary hydrogen-bonding functionalized silanes to the imprint molecule and then creating the molecular recognition site by attaching this "scaffolding" to the surface of a silica or polymer particle. After the imprint molecule is washed away, a binding site with affinity for specific molecules remains on the surface of the particle. This approach is described in the following publications incorporated herein by reference: Lele B. S., et al "Molecularly Imprinted Polymer Mimics of Chymotrypsin 1. Cooperative Effects and Substrate Specificity" React. Funct. Polym 39(1), 37–52 (1999); Lele, B. S., "Molecularly Imprinted Polymer Mimics of Chymotrypsin 2. Functional Monomers and Hydrolytic Activity" React. Funct. Polym 40(3), 215–229 (1999); and Hwang K-O, et al, "Template-Assisted Assembly of Metal Binding Sites on a Silica Surface", Mater. Sci. Eng. C, 3, 137 (1995).

This approach has some important limitations: First, the scaffolding process places the imprint molecule on the surface of the particle. Consequently, this procedure imprints only the functionality of the imprint molecule and not the molecule's shape. Additionally, there are limits to how much of the imprint molecule's functionality can be imprinted using this procedure. This is essentially a 2-dimensional form of imprinting in that only those functional groups of the imprint molecule with pre-attached complementary binding groups oriented towards the particle surface would be imprinted. Functional groups with pre-attached complementary binding groups oriented away from the surface would not be tethered to the surface and so would not be imprinted. The fewer functional groups imprinted, the lower the selectivity of the imprinted site for the target molecule, and the binding of the target molecule also will be much weaker. Second, because of the chemistry involved in attaching the imprint molecule-complementary groups complex to a surface, the "scaffolding" procedure is limited to the imprinting of particle or planar surfaces. This procedure is not useful for imprinting porous materials due to difficulties in introducing the reactants into the pores. Even if the attachment to the surfaces of the pores could be achieved, this imprinting would necessarily restrict the flow of any target molecules through the pores, thereby creating the accessibility problems this approach was designed to alleviate.

In a separate field of technology, methods have been developed for making particles and porous materials by template-directed synthesis. In these methods, surfactants are used to create molecular microstructures such as micelles or reverse micelles in a solvent medium and then inorganic or organic monomers are polymerized around the molecular microstructures at the surfactant-solvent interface. When the surfactant is removed, the remaining material has a size and shape complementary to the size and shape of the molecular microstructures. By controlling variables such as surfactant selection and concentration, a variety of different microstructure shapes such as micellar, cubic, tetragonal, lamellar, tubular and reverse micellar can be formed and, consequently, monodisperse particles of a variety of different sizes and porous materials with a variety of different shapes of pores and channels can be created. Methods of making porous material are described, for example, in the following patents and publications incorporated herein by reference: U.S. Pat. No. 5,250,282 to Kresge et al; U.S. Pat. No. 5,304,363 to Beck et al; U.S. Pat. No. 5,321,102 to Loy et al; U.S. Pat. No. 5,538,710 to Guo et al; U.S. Pat. No. 5,622,684 to Pennavaia et al; U.S. Pat. No. 5,750,085 to Yamada et al; U.S. Pat. No. 5,795,559 to Pinnavaia et al; U.S. Pat. No. 5,786,294 to Sachtler et al; and U.S. Pat. No. 5,858,457 to Brinker et al; J. C. Vartuli, et al, "Effect of Surfactant/Silica Molar ratios on the Formation of Mesoporous Molecular Sieves: Inorganic Mimicry of Surfactant Liquid-Crystal Phases and Mechanistic Implications" Chemistry of Materials, 6, 2317–2326 (1994); C.A. Morris, et al "Silica Sol as a Nanoglue: Flexible Synthesis of Composite Aerogels" Science, 284, 622–624 (1999); B. T. Holland et al, "Synthesis of Highly Ordered, Three-Dimensional, Macroporous Structures of Amorphous or Crystalline Inorganic Oxides, Phosphates and Hybrid Composites" Chem Mater 11, 795–805 (1999); and M. Antonietti, et al, "Synthesis of Mesoporous Silica with Large Pores and Bimodal Pore Size Distribution by Templating of Polymer Latices" Advanced Materials 10, 154–159 (1998). These materials, while being able to distinguish molecules on the basis of size, typically lack the specificity and activity of enzymes and antibodies. Methods for making monodisperse silica particles by hydrolyzing alkoxysilanes in a surfactant-stabilized water-in-oil microemulsion containing ammonia are described, for example, in the following patents and publications incorporated herein by reference: U.S. Pat. No. 5,209,998 to Kavassalis at al; W. Stober et al, "Controlled Growth of Monodisperse Silica Spheres in the Micron Size Range" J. Colloid Interface Sci., 26, 62 (1968); Lindberg et al, "Preparation of Silica Particles Utilizing the Sol-Gel and the Emulsion-Gel Processes" Colloids and Surfaces A 99, 79 (1995); P. Espiard et al, "A Novel Technique for Preparing Organophilic Silica by Water-In Oil Microemulsions" Polymer Bulletin, vol. 24, 173 (1990); H. Yamauchi et al, "Surface Characterization of Ultramicro Spherical Particles of Silica Prepared by W/O Microemulsion Method", Colloids and Surfaces, Vol 37, 71–80 (1989); Markowitz et al, "Surface Acidity and Basicity of Functionalized Silica Particles" Colloids and Surfaces A: Physicochem Eng. Aspects 150, 85–94 (1999). The formation of silica gel-coated metal and semiconductor nanoclusters is described in U.S. Pat. No. 5,814,370 to Martino et al. As described below, unflnctionalized silica particles have little or no catalytic activity; catalytic activity is increased with functionalized silica particles, but not to the level achieved with imprinted materials.

SUMMARY OF THE INVENTION

Accordingly, it is an object of the present invention to provide an imprinted material and a method of making an imprinted material wherein the imprinted sites are easily accessible to target molecules.

It is a further object of the present invention to provide an imprinted material and a method of making an imprinted material wherein the imprinted sites are nearly homogeneous in activity and specificity.

These and other objects are achieved by a method for making a molecularly imprinted solid structure by the steps of: providing a surfactant compound having a headgroup, wherein the headgroup comprises a group to be molecularly imprinted; combining the surfactant compound with a solvent to form a mixture and maintaining the mixture from the previous step so that molecules of the surfactant self-assemble to form at least one supramolecular structure having exposed imprint groups; combining the mixture with at least one reactive monomer so that the supramolecular structure serves as a template for the organizing of molecules of the reactive monomer surrounding or in contact with the supramolecular structure, including surrounding the imprint groups; maintaining the mixture so that the reactive monomers react with each other to form a solid structure having a shape complementary to the shape of the supramolecular structure, including the shape of the exposed imprint groups; and removing the supramolecular structure from the solid structure. The resulting structure is a porous material or particle having molecularly imprinted sites. Because the imprinting is accomplished into the material's surface, the imprinted sites are easily accessible to target molecules. And because no drastic processing steps such as grinding are required to achieve accessibility, the imprinted sites tend to be homogeneous in specificity and reactivity.

DETAILED DESCRIPTION OF THE PREFERRED EMBODIMENTS

Figure 1:
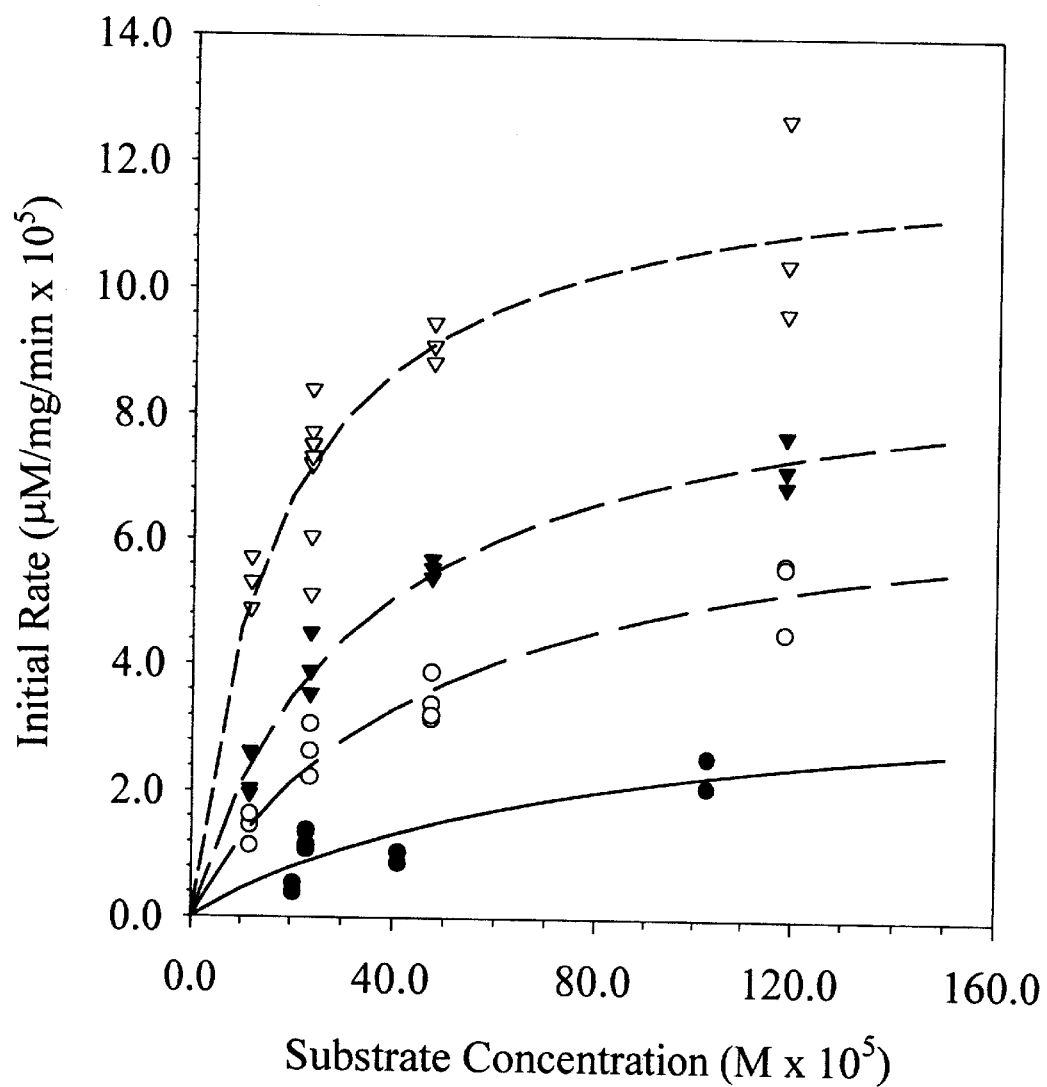
FIG. 1 shows the kinetics of the hydrolysis of DL-BAPNA catalyzed by non-imprinted silica particles (●) and silica particles surface-imprinted with 10% (o), 20% (▼), and 40% (▽) N-α-decyl-L-phenylalanine-2-aminopyridine. All particles contain 5 wt % (total silica) of a mixture of PEDA, IPTS, and CTES.

The present invention provides methods for making molecularly imprinted particles and porous materials having accessible and homogeneous imprinted sites.

As used herein, the term "molecularly imprinted" material refers to material that has been polymerized around molecules of an imprint compound in such a way that when the imprint group is removed from the material, cavities or "imprinted sites" remain in the material that are negative images of the imprint compound. When the molecularly imprinted material is subsequently exposed to a solution containing the imprint compound, the imprinted sites selectively bind the imprint compound. This selective binding allows the material to be used as an artificial antibody or enzyme. For even greater selectivity of the molecularly imprinted material, functional monomers with complementary binding affinity to functional groups on the imprint compound can be incorporated into the material.

To make a molecularly imprinted material according to the present invention, an imprint group is coupled to, or forms the headgroup of, a surfactant. The surfactant is then maintained in a mixture under conditions in which the molecules of the surfactant form at least one supramolecular structure and wherein the imprint groups are exposed on the surface of the supramolecular structure. The solution is combined with reactive monomers (which can include functionalized monomers) under sufficient conditions so that the reactive monomers surround the supramolecular structure, including the exposed imprint groups. The reactive monomers are polymerized to form a solid structure that has the negative shape of the supramolecular structure. That is, it has a surface topography that is complementary to the surface topography of the supramolecular structure. The supramolecular structure is then removed, and what is left behind is a solid structure that has pores, channels, or other types of voids corresponding to the shape of the supramolecular structure. Because the imprint groups were exposed on the surface of the supramolecular structure when the solid structure was formed, the surfaces or walls of the voids include imprint sites, which are indentations in the surface having a shape complementary to the shape of the imprint group. These imprint sites, because they are created on the surfaces or walls of voids, are extremely accessible, much more so than when the imprint group alone is used to create a molecularly imprinted material.

By this method, a porous structure having pores or channels and having molecularly imprinted indentations or cavities in the walls or surfaces of the pores or channels may be created. Typically, the pores or channels may be in the size range of about 0.01 µm to about 0.5 µm or greater Alternatively, molecularly imprinted particles may be formed by combining an imprint group-coupled surfactant as described above with an organic solvent and water to form a water-in-oil microemulsion. In the microemulsion, molecules of the surfactant arrange themselves so that the imprint groups are in the water phase and the hydrophobic tails are in the organic phase. When a water-soluble reactive monomer is added and caused to polymerize in the water phase, the particles that are formed have indentations in their surfaces that are the mirror image of the imprint groups. If functionalized reactive monomers are also added to the microemulsion, the imprinted sites of the particles will include functional groups in a spaced-apart arrangement corresponding to the location of complementary functional groups on the imprint group. By this method, imprinted particles of a variety of sizes can be created. For example, imprinted particles having a narrow size distribution and having an average size of between about 50 and about 1200 nm can be created.

The imprint group in the present invention can be any chemical entity for which it would be useful to have imprinted sites. For example, if the imprinted material is to be used as an artificial antibody, the imprint group can be the compound or a portion of the compound sought to be bound by the antibody. If the imprinted material is to be used as an enzyme, the imprint group can be a transition state analog (TSA), that is, an analog of the transition state that is formed during the enzymatic conversion of a substrate to a product. The imprint group may also be an inhibitor (a compound that inhibits enzyme activity), a substrate or a substrate analog of the enzyme.

The surfactant in the present invention can be any compound such as, for example, an amphiphilic compound, that is capable of self-assembling in solution to form one or more supramolecular structures or any monomeric or polymeric surfactant that can form lamellar and/or non-lamellar phases. The imprint group is coupled to the surfactant by any sufficient means so that when molecules of the surfactant form one or more supramolecular structures, the imprint groups are exposed on the surface of the supramolecular structures. Preferably, the surfactant is an amphiphilic compound having a hydrophilic headgroup and a hydrophobic tail, and the imprint group makes up, or forms part of, the headgroup of the compound. (Such a surfactant can be created, for example, by acylating a hydrophilic imprint compound so that the combination of a hydrophilic headgroup and a hydrophobic acyl tail gives the compound the amphiphilic properties of a surfactant.) Due to thermodynamic driving forces, molecules of an amphiphilic surfactant self-assemble in an aqueous medium to minimize the exposure of their hydrophobic portions to the medium, while maximizing the exposure of the hydrophilic headgroup. Consequently, if a surfactant has an imprint group as a headgroup, in whole or in part, the imprint group will be exposed to the surfaces of the self-assembled structure and imprinted sites will be formed when these surfaces are subsequently mineralized or when a mirror-image polymer is created.

Alternatively, the imprint group could be attached to the end of a hydrophobic portion of a surfactant. In this embodiment, a non-aqueous solvent or a solvent combination having an oil phase would be selected so that when a supramolecular structure is formed in a solvent, the imprint group would exposed be to the non-aqueous or oil phase. The organic or inorganic reactive monomers would be selected so that they polymerize in a non-aqueous environment and imprinting would occur at the surface of a polymer formed in the oil phase.

The imprint group-coupled surfactant is combined with a solvent and the solution is maintained under conditions of temperature, time, pH and surfactant concentration so that molecules of the surfactant self-assemble into supramolecular structures. The conditions of temperature, time, pH and surfactant concentration that are sufficient depends on the particular surfactant and how it behaves in the particular solvent. The sufficient conditions can be readily determined by experimentation based on what is known about the behavior of non-coupled surfactants. Preferably, the surfactant is selected and paired with a particular solvent wherein it is known that supramolecular structures will form easily.

The solution may also contain at least one additional surfactant, that is, a surfactant that does not have an imprint group associated with it. The additional surfactant is selected so that it also self-assembles with the imprint group-coupled surfactant and becomes incorporated into the supramolecular structure. An additional surfactant would be used, for example, in instances where the imprint group is a relatively large molecule compared to the surfactant and wherein it would be desirable to spread out the exposed imprint groups on the surface of the supramolecular structure.

The term "supramolecular structure" includes any liquid crystal structure formed by the arrangement of surfactant molecules in a solvent. Examples of structures include micelles, vesicles, bicontinuous cubic phase, hexagonal phase, tubules or reverse micelles. The size and type of structures that are formed depends on variables such as the temperature, pH, the concentration of the imprint group-surfactant, the identity and concentration of any additional surfactant, the identity of the solvent, the identity and concentration of the reactive monomer, etc. Because the purpose of the supramolecular structure is to provide accessibility for imprinted sites, it will often not be critical which particular liquid crystal structure is formed, as long as a supramolecular structure is formed that can serve as a template and that can hold the imprint groups in an exposed position on the surface of the supramolecular structure. Likewise, in the formation of imprinted particles in a water-in-oil microemulsion, the size of the particles that can be formed is affected by variables such as the temperature, pH, the concentration of the imprint group-surfactant, the identity and concentration of any additional surfactant, the identity of the solvent, the identity and concentration of the reactive monomer, etc.

The mixture of the imprint group-coupled surfactant and solvent is combined with reactive monomers. The reactive monomers may be added either before or after the supramolecular structures form. The mixture is maintained under sufficient conditions of time, temperature and monomer concentration so that the monomers surround the supramolecular structure and so that the supramolecular structure acts as a template to direct the organizing and positioning of the monomers around the structure. The sufficient conditions depend on the particular monomers used and are either well known for specific monomers or can be readily determined by experimentation. Because the imprint groups are exposed on the surface of the supramolecular structure, the reactive monomers surround the imprint groups as well. The addition of the inorganic monomers may induce changes in the supramolecular structure from the micellar surfactant phase to a mesoporous surfactant phase (cubic or hexagonal) during the polymerization or mineralization process, but this would not affect the creation of imprinted sites. In this manner, mesoporous metal oxide materials can be formed in wter using an acid or base catalyst. Cationic surfactants, such as cetyltrimethylammonium bromide (CTAB), or non-ionic surfactants, such as BRIJ® type (a class of polyoxyethylene alkyl ethers sold by ICI Americas Inc., Wilmington, Del.) or amphiphilic block co-polymers, can be used to form the liquid-crystalline phases (LC) that transform to cubic or hexagonal phases upon complexation with the monomeric inorganic precursor. Subsequent hydrolysis and condensaton of this monomer, followed by removal of the surfactant results in formation of the mesoporous metal oxide.

The reactive monomers can be molecules any compound or compounds that are capable of surrounding the supramolecular structure and that can be reacted with each other or polymerized to form a solid or shape-retaining structure with a shape that is complementary to the shape of the supramolecular structure and the exposed imprint groups. The monomers are selected according to the desired end product. For example, to make an inorganic oxide or metal oxide molecularly imprinted material, the monomers may be inorganic oxide or metal oxide precursors. As a more specific example, to make a molecularly imprinted material of silica, the reactive monomers may be alkoxysilanes, particularly tetraalkoxysilanes such as tetraethoxysilane (TEOS), tetramethoxysilane (TMOS), tetrabutoxysilane (TBOS), etc. To make inorganic oxides containing germanium, titanium or aluminum, reactive monomers include, but are not limited to, tetramethoxygermane, tetraisoprpoxygermane, tetraethoxygermane, tetrabutoxygermane, aluminum n-butoxide, aluminum isoproxide, titanium ethoxide, titanium diisopropoxide (bis-2,4-pentanedionate), titanium methyl phenoxide, vanadium triisopropoxide oxide, vanadium tri-n-propoxide, zirconium n-butoxide, zirconium n-propoxide, etc. Mixed inorganic or metal oxides may be made by combining inorganic precursors. To make an organic molecularly imprinted material, the reactive monomers may be polymerizable organic monomers including, but not limited to, acrylate, methyl methacrylate, olefins, pyrrole, saccharides, silanes, styrene, isocyanates, vinyl acetate, vinyl chloride, etc. Mixed materials may be made by combining inorganic and organic reactive monomers.

The reactive monomers may include functionalized monomers, that is, monomers that have functional moieties with complementary binding affinity for functional moieties on the imprint group by, for example, hydrogen-bonding, electrostratic interactions or other van der Waals interactions. Examples of functional moieties include, but are not limited to, amine (primary, secondary, tertiary, quaternary), hydroxyl, carboxylate, sulfhydryl, amino acids, metal chelates such as iminodiacetic acid-metal ions (divalent or trivalent metal ions), ureido, urea, thiourea, amidine, methyl, phenyl, fluorocarbons, nucleotides, phosphonucleotides, phosphates, saccharides, multiple combinations of any of the these (ie. dicarboxylates, diamines, etc), and multiple combinations of different functional groups. As the reactive monomers surround the supramolecular structure, the functionalized monomers will tend to become spatially distributed and oriented around the imprint groups so that they form binding complexes with the corresponding functional moieties on the imprint group. Then, as the reactive monomers are polymerized, the functionalized monomers are locked in place. In the formation of a silica imprinted structure using a tetraalkoxysilane such as tetraethoxysilane, examples of functionalized monomers that can be used include 3-(Aminoethylaminomethyl)-phenyltrimethoxysilane (PEDA), carboxyethylsilanetriol (CTES), and N-(3-triethoxysilylpropyl)-4,5-dihydroimidazole (IPTS), 3-aminoalkyltriethoxysilane, N-(2-aminoethyl)-3-aminopropyltrimethoxysilane, decyltriethoxysilane, hydroxymethyltriethoxysilane, isobutylmethyldimethoxysilane, 3-mercaptopropyltriethoxysilane, pentafluorophenylpropyl-9-trimethoxysilane, phenyltrimethoxysilane, N-trimethoxysilylpropyl-N,N,N-trimethylammonium chloride, ureidopropyltriethoxysilane, and 3-trihydroxysilyl-propylmethylphosphonate, sodium salt.

The sufficient conditions under which the monomers react varies depending on the monomer and is either well known for a particular monomer or can be readily determined by experimentation. Inorganic monomers generally polymerize in water in the presence of a catalyst. For example, tetraethoxysilanes and similar monomers hydrolyze in water at room temperature in the presence of an ethanol/ammonia catalyst. Organic monomers polymerize in the presence or absence of a catalyst at varying temperatures, solvent mixtures, pressure, exposure to UV irradiation etc., depending on the particular monomer.

After the reactive monomers are reacted to form molecularly imprinted particles or a molecularly imprinted porous structure, the molecules of the surfactant are extracted and removed. This can be done by any means such as, for example, washing the particles or the structure.

Having described the invention, the following examples are given to illustrate specific applications of the invention including the best mode now known to perform the invention. These specific examples are not intended to limit the scope of the invention described in this application.

EXAMPLES

Molecular imprinting and template directed synthesis were used to create catalytic silica particles that have catalytic activity as esterase mimics. Specifically, L-phenylalanine-2-aminopyridine (a chymotrypsin transition state analog (TSA)) and 3-aminophenyl-boronic acid (a chymotrypsin inhibitor) were acylated to form amphiphilic imprint molecules, which were then mixed with the nonionic surfactant polyoxyethylene(5) nonylphenyl ether (NP-5). These surfactant mixtures were used to form microemulsions that were then utilized to synthesize surface imprinted silica particles from tetraethoxysilane (TEOS) and amine, carboxylate, and dihydroimidazole functionalized silanes. The effects of the surfactant TSA structure, surfactant TSA/NP-5 ratios, and functionalized silane/TEOS ratios on the catalytic activity of the particles is described. In addition, the specificity of these particles is discussed.

Materials and Equipment 3-(Aminoethylaminomethyl)-phenyltrimethoxysilane (PEDA), carboxyethylsilanetriol (CTES), and N-(3-triethoxysilylpropyl)-4,5-dihydroimidazole (IPTS) were purchased from Gelest (Tullytown, Pa.); Tetraethoxysilane (TEOS), Igepal® CO-520 (polyoxyethylene(5) nonylphenyl ether) (NP-5), 3-aminophenylboronic acid, 2-aminopyridine, dicyclohexylcarbodiimide (DCC), trifluoroacetic acid (TFA), ethanol, cyclohexane, acetonitrile, and dimethyl sulfoxide (DMSO) were purchased from Aldrich Chemical Co. (Milwaukee, Wis.); N-α-t-BOC-L-phenylalanine was purchased from Calbiochem-Novabiochem Corp. (San Diego, Calif.); methanol and glacial acetic acid were purchased from Fisher Scientific (Pittsburgh, Pa.); all chemicals were used as received. Saturated solutions of ammonia in ethanol were prepared by passing ammonia gas into denatured ethanol at 20° C. for 5–6 hours. Electron microscopy was performed with a Zeiss EM-10 transmission electron microscope operated at 60 kV. UV/Vis spectroscopy was performed with a Beckman DU-650 spectrophotometer.

Synthesis of Imprint Group-coupled Surfactants

The following describes the synthesis of two compounds, N-α-decyl-L-phenylalanine-2-aminopyridine and 3-octylamidophenylboronic acid, that were used to create molecularly imprinted polymers by template-directed synthesis. Each of these compounds is a surfactant that comprises a headgroup and an acyl tail, the headgroup being the portion of the compound that is to serve as the imprint group.

Synthesis of N-α-decyl-L-phenylalanine-2-aminopyridine (a surfactant—α-chymotrypsin transition state analog). This compound has the following structure:

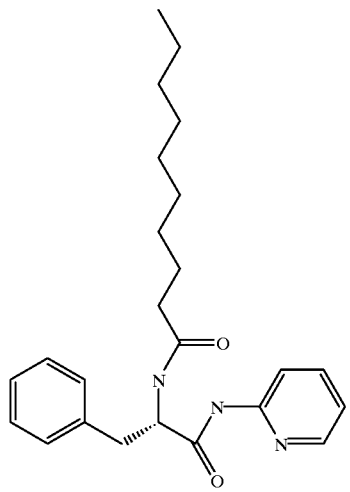

The acylated phenylalanine anilide imprint molecule was synthesized in three steps. (1) N-α-t-BOC-L-phenylalanine was coupled with 2-aminopyridine using DCC to give N-α-t-BOC-L-phenylalanine-2-aminopyridine. (2) The a-amine was then deprotected with TFA to give N-α-L-phenylalanine-2-aminopyridine.(3) To create a compound having the properties of a surfactant, the free amine was then acylated with decanoic acid using DCC to give N-α-decyl-L-phenylalanine-2-aminopyridine.

(1) Synthesis of N-α-t-BOC-L-phenylalanine-2-aminopyridine: DCC(4.4 g, 21.1 mmol) was added to a solution of N-α-t-BOC-L-phenylalanine(10 g, 37.7 mmol) in 200 mL THF at 0° C. The mixture was stirred for 30 minutes and then filtered. 2-Aminopyridine (4.5 g, 41.5 mmol) was added to the filtrate in a round bottom flask and the mixture was stirred overnight. The reaction mixture was filtered and the solvent was evaporated under reduced pressure until approximately 20 mL of THF remained. Petroleum ether was added and the product was precipitated from solution overnight. The semi-solid precipitate collected by filtration was purified by silica gel column chromatography (95:4:1 $CHCl_3$:$CH_3OH$:$H_2O$, v/v/v) to give 8 g (60% yield) of the desired amide.

(2) Synthesis of N-α-L-phenylalanine-2-aminopyridine: -α-t-BOC-L-phenylalanine-2-amino-pyridine (2 g, 5.8 mmol) was dissolved in 10 mL 1:1 TFA:$CH_2Cl_2$ (v/v) and stirred vigorously for 10 min. The TFA:$CH_2Cl_2$ solution was then evaporated under a stream of $N_2$. The residue was dissolved in 1 mL $CHCl_3$ and purified by silica gel column chromatography (80:18:2 $CHCl_3$:$CH_3OH$:$H_2O$, v/v/v) to give 1.4 g of N-α-L-phenylalanine-2-aminopyridine in quantitative yield.

(3) Synthesis of N-α-decyl-L-phenylalanine-2-aminopyridine: DCC (1.0 g, 4.85 mmol) was added to a solution of decanoic acid (1.50 g, 8.7 mmol) in 10 mL of chloroform under nitrogen atmosphere. A white suspension was formed after stirring for 3 hours at room temperature. The solid was removed by filtration. To the chloroform solution, 10 mL of a THF solution of N-α-L-phenylalanine-2-aminopyridine (1.0 g, 4.1 mmol) was added. After stirring at room temperature for 12 hours, a white suspension was formed. The solvents were removed under reduced pressure and the resulting solid was purified first by silica gel column chromatography with a mixture of chloroform/methanol=95:5(v/v) as the eluent, then by crystallization in a mixture of hexanes and toluene to give N-α-decyl-L-phenylalanine-2-aminopyridine as a white crystalline solid (1.1 g, yield: 67%).

Synthesis of 3-Octylamidophenylboronic acid (a surfactant—α-chymotrypsin inhibitor). This compound has the following structure:

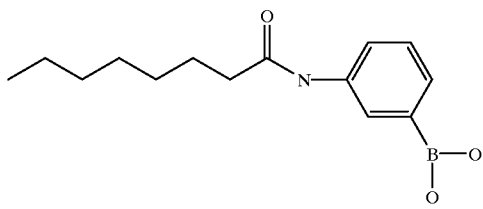

Octanoyl chloride (4.6 g, 28.3 mmol) was added slowly to a solution of 3-aminophenylboronic acid (5.0 g, (26.9 mmol) in DMSO (50 mL) containing pyridine (2.3 mL, 28.3 mmol). After addition was complete, the reaction mixture was stirred overnight. The reaction mixture was diluted with 500 mL water and extracted with chloroform. The organic fractions were collected and dried over $MgSO_4$, filtered, and then, the solvent was evaporated under reduced pressure to give the crude product as an oil. The oil was redissolved in a small amount of chloroform and passed through a cation exchange column (Bio-Rad AG50W-X8 resin, 20–50 mesh, hydrogen form) to remove any pyridine bound to the boronic acid. The crude product was then purified by silica gel column chromatography (98:2 $CHCl_3$:$CH_3OH$, v/v) to give 2.5 g, (35.6% yield) of the desired product.

Synthesis of Particles

The following particles were synthesized:

Silica Particles Without Modification (comparative example)

Silica particles that did not contain functionalized silanes were prepared by stirring a saturated solution of ammonia in ethanol with cyclohexane, the surfactant Igepal® CO-520 (polyoxyethylene(5) nonylphenyl ether) (NP-5), and water for 30 minutes at room temperature and then adding tetraethoxysilane (TEOS). Stirring continued overnight. The volume of the reaction mixture was reduced by vacuum evaporation and the particles were separated from the remaining reaction mixture by centrifugation, washed three times with a wash solution consisting of 4 parts methanol, one part glacial acetic acid, and one part water, followed by washing three times with acetonitrile. The particles were then air dried overnight. Unstained, unwashed particles on copper grids were observed by electron microscopy to determine particle size.

Silica Particles with Surface Amine, Dihydroimidazole, and Carboxylate Groups (Comparative example)

Silica particles with surface amine, dihydroimidazole, and carboxylate groups were prepared by including measured amounts of 3-(aminoethylaminomethyl)-phenyltrimethoxysilane (PEDA), carboxyethylsilanetriol (CTES), and N-(3-triethoxysilylpropyl)-4,5-dihydroimidazole (IPTS) to the saturated solution of ammonia/ethanol, cyclohexane, Igepal® CO-520 (polyoxyethylene(5) nonylphenyl ether) (NP-5), and water described above, before stirring and adding TEOS. The particles were separated and dried as described above.

Imprinted Silica Particles Made Without Functionalized Silanes

Imprinted silica particles were prepared by mixing NP-5 with an imprint group-coupled surfactant and solubilizing in ethanol/cyclohexane and then adding the mixture to the ammonia/ethanol mixture. TEOS was then added and particles were formed, separated and dried in the same manner as described above.

Imprinted Silica Particles Made with Functionalized Silanes

Imprinted silica particles made with functionalized silanes were prepared by mixing NP-5 with an imprint group-coupled surfactant and solubilizing in ethanol/cyclohexane and then adding the mixture to the ammonia/ethanol mixture. 3-(Aminoethylaminomethyl)-phenyltrimethoxysilane (PEDA), carboxyethylsilanetriol (CTES), and N-(3-triethoxysilylpropyl)-4,5-dihydroimidazole (IPTS) were added before stirring and TEOS was added. The particles were formed, separated and dried in the same manner as described above.

Assay for Hydrolytic Activity.

Hydrolytic activity of the silica particles was determined by observing the hydrolysis of succinyl-Ala-Ala-Pro-Phe-p-nitrophenyl ester (Suc-AAPF-PNP), a chymotrypsin substrate, and benzoyl-DL-arginine-p-nitrophenyl ester (DL-BAPNA), a standard chromogenic substrate oftrypsin.

Suc-AAPF-PNP has the following structure:

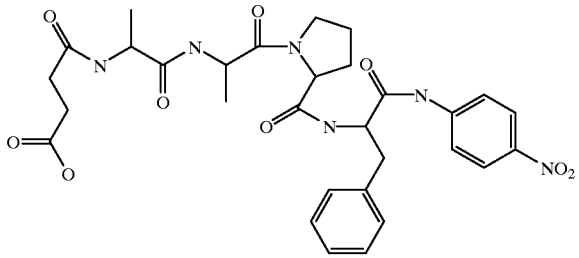

L-BAPNA has the following structure:

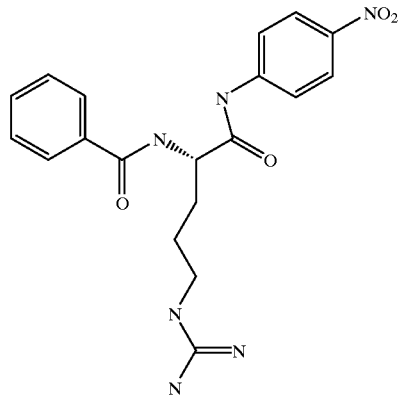

D-BAPNA has the following structure:

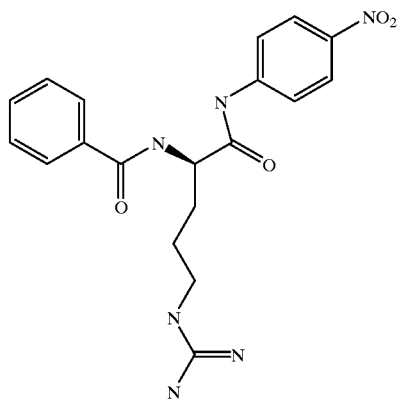

Substrate stock solutions were prepared by dissolving ~50 mg BAPNA or suc-AAPF-PNP in DMSO; these stock solutions were then diluted with DMSO and 0.1 M TRIS/HCl buffer (pH 7.4) to provide substrate solutions of various concentrations (final concentration of DMSO in each substrate solution was 15% v/v). A measured quantity of particles, 30–100 mg, were placed in a microcentrifuge tube, 1.3 ml of substrate solution was added, and the mixture was bath-sonicated to completely disperse the particles. The mixture was then placed in a water bath at 30° C. for 5–6 hours, with additional agitation provided every 45–60 minutes. The mixture was then removed from the water bath and centrifuged at 14,000 rpm for 30 minutes. The reaction time was measured from initial sonication to the beginning of centrifugation. Catalytic activity was determined from the increase in free p-nitrophenol concentration, measured by UV/VIS spectroscopy at 410 nm with an extinction coefficient of 8500 $M^{-1}$ $cm^{-1}$. The measured absorbance was compared to that of the substrate solution at 410 nm and from the absorbance due to light scattering of the particle dispersion of particles in 0.1 M Tris buffer (prepared identically as above) at 410 nm. These contributions to the absorbance were subtracted from the total absorbance at 410 nm to obtain the absorbance due to free p-nitrophenol. Each data point was calculated based on the average of 3 to 7 trials.

Differentiation of Catalytic Activity after Imprinting in Non-functionalized and Functionalized Silica Particles Using the above procedure, the catalytic activity of functionalized and non functionalized silica particles imprinted with N-α-decyl-L-phenylalanine-2-aminopyridine was measured. The substrate was Suc-AAPF-PNP at a concentration of 0.2 mM. The reactions were performed in Tris buffer (50 mM), pH 7.8, in a volume of 1.0 ml. Rates were converted from Absorbance (410 nm) units into 11 mol units via a standard curve with p-nitroanilide. The data were normalized per mg of catalyst.

Rates are given as μmol nitroanilide/(mg catalyst min). The rate of hydrolysis using imprinted particles containing 5% amine silane, 5% carboxylate silane, and 5% imidazole silane was $5.2 \times 10^{-5}$; the rate of hydrolysis using imprinted particles with no amine, carboxylate, or imidazole groups was $1.0 \times 10^{-5}$; the rate of hydrolysis using non imprinted particles containing 5% amine silane, 5% carboxylate silane, and 5% imidazole silane was $3.0 \times 10^{-6}$; the rate of hydrolysis using non imprinted particles without any functional groups was $1.9 \times 10^{-6}$; A table of these results is given below:

TABLE 1

Initial rate of hydrolysis of Suc-AAPF-PNP catalyzed by functionalized and nonfunctionalized imprinted silica particles

| Description | Initial Rate[a] | Ratio[b] |
|---|---|---|
| 5% PEDA + 5% CTES + 5% IPTS + 20% TSA | $5.2 \times 10^{-5}$ | 27.3 |
| No modifiers + 40% TSA | $3.4 \times 10^{-5}$ | 17.9 |
| No modifiers + 20% TSA | $1.0 \times 10^{-5}$ | 5.3 |
| 5% PEDA + 5% CTES + 5% IPTS, No TSA | $3.0 \times 10^{-6}$ | 1.6 |
| No modifiers and no TSA | $1.9 \times 10^{-6}$ | 1.0 |

[a]Initial Rate in μmol nitroanilide/(mg catalyst-min)
[b]Ratio of (sample)/(unmodified silica particles)

This example demonstrates that catalytic activity is greater for imprinted particles with functional groups and that non imprinted particles have far less catalytic activity.

Differentiation of Catalytic Activity of Silica Particles Imprinted with Different Enzyme Transition State Analogs:

Using the above procedure, the catalytic activity of functionalized and non functionalized silica particles imprinted with N-α-decyl-L-phenylalanine-2-aminopyridine, 3-octylamidophenylboronic acid and BOC-L-Phe-2-aminopyridine (a non-acylated imprint molecule used as a comparative example), was measured. The substrate was DL-BAPNA, a solution of which was prepared by dissolving 400–500 mg BAPNA in 5 ml dimethyl sulfoxide, and diluting 0.1 ml aliquots of this preparation to 10 ml with 0.1 M Tris buffer (pH 7.4) to yield a ~0.2 mM BAPNA solution. The trypsin catalyzed rate of substrate BAPNA hydrolysis has been calculated from a literature report as 6.7 μM $mg^{-1}$ $min^{-1}$ at 25° C. Ester hydrolysis was performed at 30° C. Three to seven hydrolysis measurements were made for each type of particle, and an analysis of variance at a 95% confidence level indicates that improvement in hydrolysis rate is provided by both the presence of the functional silanes on the particle surface and the presence of the imprint molecule during particle synthesis, and that there is a significant correlation between these two factors. A table of the initial rate data is given below.

TABLE 2

Initial rate data for the hydrolysis of DL-BAPNA catalyzed by silica particles surface-imprinted with different imprint molecules.

| Imprint Molecule | Wt. % of Added Functionalized Silanes[a] | Initial Rate (μM/mg/min*$10^5$) | σ (μM/mg/min*10)[b] |
|---|---|---|---|
| None | 0 | 0.47 | 0.128 |
| None | 5 | 0.83 | 0.302 |
| 3-Octylamidophenyboronic acid | 0 | 1.04 | 0.26 |

TABLE 2-continued

Initial rate data for the hydrolysis of DL-BAPNA catalyzed by silica particles surface-imprinted with different imprint molecules.

| Imprint Molecule | Wt. % of Added Functionalized Silanes[a] | Initial Rate ($\mu$M/mg/min*$10^5$) | $\sigma$ ($\mu$M/mg/min*10)[b] |
|---|---|---|---|
| 3-Octylamidophenyboronic acid | 5 | 1.81 | 0.324 |
| BOC-L-Phe-2-aminopyridine | 0 | 1.30 | 0.162 |
| BOC-L-Phe-2-aminopyridine | 5 | 1.41 | 0.156 |
| N-Decyl-L-Phe-2-aminopyridine | 0 | 1.37 | 0.302 |
| N-Decyl-L-Phe-2-aminopyridine | 5 | 3.98 | 0.489 |

[a] Mixture of PEDA, CTES and IPTS
[b] Based on 3 to 7 measurements

Particles surface-imprinted with the acylated phenylalanine and arninophenylboronic acid imprint molecules demonstrate an increased enhancement of hydrolytic activity in the presence of functional surface silanes. In contrast, particles surface-imprinted with non-acylated phenylalanine in the presence of functionalized silanes do not reveal a similar rate enhancement.

Effect of Increasing Amount of Functional Silanes and Imprint Molecule on Hydrolytic Activity.

Using the above procedure, the catalytic activity of functionalized silica particles imprinted with increasing amounts of N-α-decyl-L-phenylalanine-2-aminopyridine was measured. The following table summarizes how the initial rate of hydrolysis of DL-BAPNA is affected by differences in the amount of functional surface silanes and amount of imprint molecule used during the preparation of catalytic particles:

TABLE 3

Initial rate data for the hydrolysis of DL-BAPNA catalyzed by silica particles surface-imprinted with N-α-decyl-L-phenylalanine-2-aminopyridine.

| Amount of Imprint Molecule (Mol % of Total Surfactant) | Amount of Functionalized Silanes[a] (Wt % of Total Silica) | Substrate Concentration (mM) | Initial Rate ($\mu$M/mg/min*$10^5$) | $\sigma$ ($\mu$M/mg/min*$10^5$) |
|---|---|---|---|---|
| 0 | 5 | 0.2 | 0.83 | 0.30 |
| 10 | 5 | 0.2 | 2.65 | 0.42 |
| 10 | 5 | 0.4 | 3.41 | 0.33 |
| 10 | 10 | 0.4 | 3.92 | 0.89 |
| 10 | 15 | 0.4 | 4.17 | 0.38 |
| 20 | 5 | 0.2 | 3.98 | 0.49 |
| 20 | 5 | 0.4 | 5.55 | 0.15 |
| 20 | 10 | 0.4 | 4.12 | 0.37 |
| 40 | 5 | 0.2 | 7.11 | 0.97 |
| 40 | 5 | 0.4 | 9.13 | 0.32 |
| 40 | 15 | 0.4 | 6.28 | 0.62 |

[a] Mixture of PEDA, CTES and IPTS
[b] Based on 3 to 7 measurements

With three to seven hydrolysis measurements for each particle type, an analysis of variance on the results obtained in 0.4 mM substrate solution indicates that there is no significant difference in hydrolysis rate resulting from increasing the amount of functional silanes present in the particle; therefore, although the presence of a small amount of functional silanes in the catalytic particle provides some improvement in hydrolysis rate, there is no added benefit from increasing the amount of functional silanes beyond a certain level. There is, however, a significant benefit from increasing the amount of imprint molecule used in the synthesis of the catalytic particles. It was found that this effect is linear up to 40% added imprint molecule in the NP-5 surfactant used in the microemulsion to prepare the particles.

Evaluation of Kinetic Parameters for Catalytic Particles.

The catalytic activity of imprinted silica particles was studied over a range of initial substrate concentrations, from about 0.1 mM to 1.0 mM. FIG. 1 shows data for a series of silica particles synthesized with 5% incorporated functional silanes (PEDA, IPTS, CTES mixture) and 0, 10, 20, and 40% added acylated phenylalanine-2-aminopyridine anilide imprint molecule. Data for hydrolysis catalyzed by non-imprinted silica is included in the plot for comparison although this data is not expected to follow saturation kinetics. Solid lines in the figure represent curves fitting the data to the Michaelis-Menten equation, $$v = \frac{K_1 S}{K_2 + S}$$

using parameters for $K_1$, and $K_2$ derived from non-linear regression. The following table summarizes $K_1$ and $K_m$ parameters for a number of different imprinted silicas:

TABLE 4

Kinetic constants for the hydrolysis of DL-BAPNA catalyzed by non-imprinted silica particles and by silica particles surface-imprinted with N-α-decyl-L-phenylalanine-2-aminopyridine.

| Amount of Imprint Molecule (Mol% of Total Surfactant) | Amount of Functionalized Silanes (Wt % of Total Silica) | $K_1$ ($\mu$M/mg/min*$10^5$) | $\sigma$ ($\mu$M/mg/min*$10^5$) | $K_2$ (mM) | $\sigma$ (mM) | $K_1/K_2$ (mg$^{-1}$ min$^{-1}$) |
|---|---|---|---|---|---|---|
| 10 | 5 | 7.29 | 0.71 | 0.48 | 0.10 | 0.15 |
| 20 | 0 | 5.24 | 0.78 | 0.65 | 0.18 | 0.08 |
| 20 | 5 | 9.41 | 0.05 | 0.34 | 0.04 | 0.28 |
| 40 | 5 | 12.5 | 0.08 | 0.17 | 0.03 | 0.74 | a. 20 mol % (total surfactant) of imprint molecule used for imprinting.
b. Particles contain 5 wt % (total silica) of functionalized silanes (PEDA, IPTS, CTES mixture).
c. Constants calculated from non-linear regression of data in FIG. 1. Each data point was determined from at least two trials.
d. Reaction data not plotted in FIG. 1.

One observed trend is that the value of $K_1/K_2$, a measure of catalytic efficiency per mg of silica, increases with increasing amount of imprint molecule used during particle synthesis, as well as when functional silanes are present in the catalyst.

Selectivity of Molecularly Imprinted Catalysts to Several Substrates.

Figure 2:
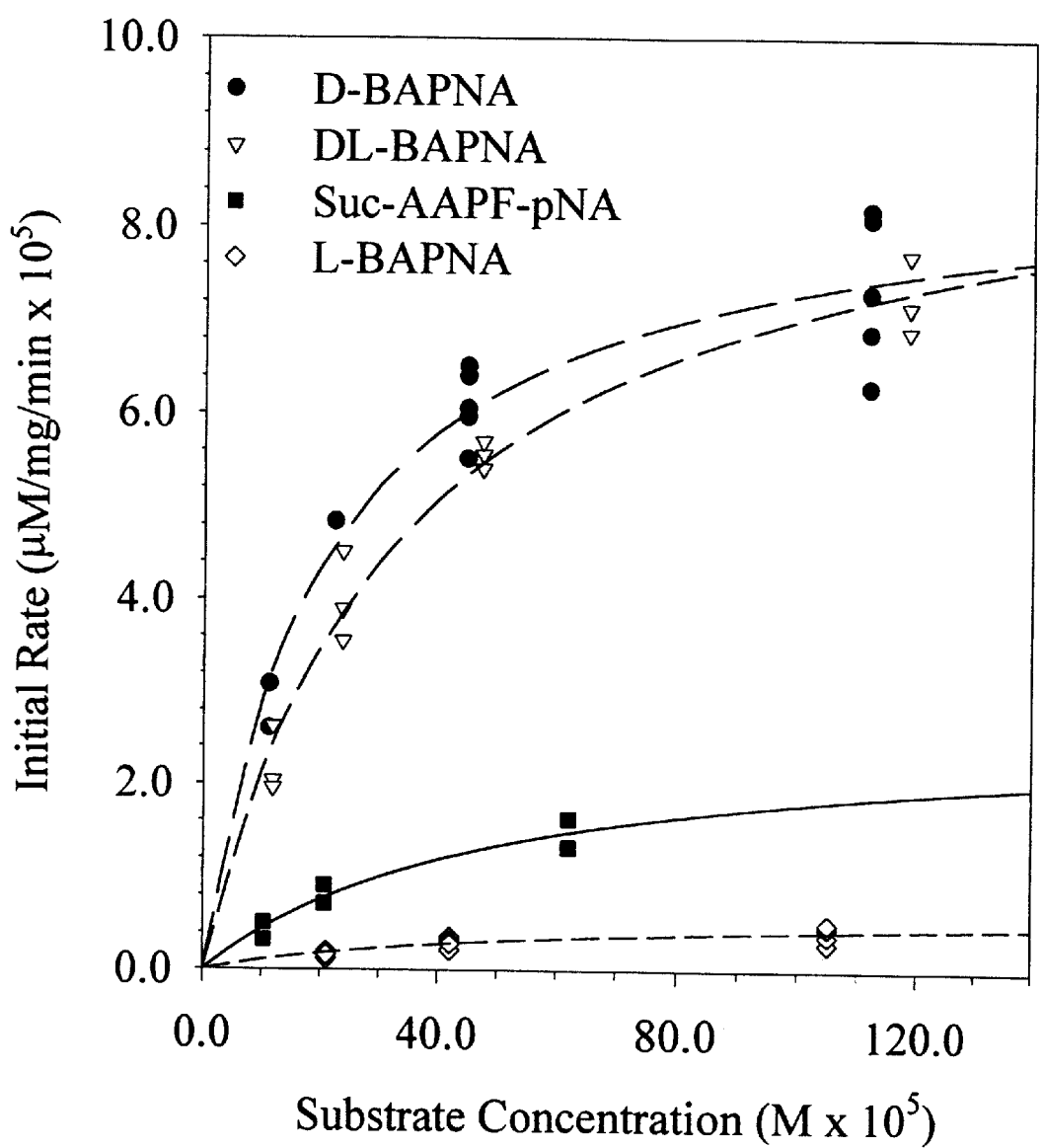
FIG. 2 shows the kinetics of the hydrolysis of various substrates by silica particles surface-imprinted with N-α-decyl-L-phenylalanine-2-aminopyridine. All particles contain 5 wt % (total silica) of a mixture of PEDA, IPTS, and CTES.

FIG. 2 presents data for the hydrolysis of racemic trypsin substrate DL-BAPNA, the optically pure substrates D- and L-BAPNA, and the α-chymotrypsin substrate succinyl-Ala-Ala-Pro-Phe-p-nitroanilide. Solid lines in the FIG. 2 represent curves fitting the data to the Michaelis-Menten equation. The following table presents $K_1$, $K_2$ and $K_1/K_2$ for succinyl-Ala-Ala-Pro-Phe-p-nitrophenol and D- and DL-BAPNA.:

TABLE 5

Selectivity of catalysis by silica particles surface-imprinted with N-α-decyl-L-phenylalanine-2-aminopyridine.

| Substrate | $K_1$ (μM/mg/ min*$10^5$) | σ (μM/mg/ min*$10^5$) | $K_2$ (mM) | σ (mM) | $K_1/K_2$ (min$^{-1}$) |
|---|---|---|---|---|---|
| Suc-AAPF-NA | 2.70 | 0.69 | 0.52 | 0.24 | 0.05 |
| DL-BAPNA | 9.41 | 0.48 | 0.34 | 0.24 | 0.28 |
| D-BAPNA | 9.43 | 0.54 | 0.24 | 0.24 | 0.39 |
| L-BAPNA | 0.65 | 0.11 | 0.55 | 0.21 | 0.01 | a. 20 mol% (total surfactant) of imprint molecule used for imprinting.
b. Particles contain 5 wt % (total silica) of functionalized silanes (PEDA, IPTS, CTES mixture).
c. Each data point was determined from at least two trials.

There are two interesting features of this data set. First, the catalyst particle seems to be selective for the trypsin substrate D-BAPNA over the chymotrypsin substrate, even though the imprint molecule more closely mimics the chymotrypsin substrate. Second, the particles appear to be selective for the D isomer of the trypsin substrate, even though the imprint molecule had the L-isomer configuration. In fact, the L-BAPNA is almost completely inert to the particles.

These results demonstrate that template-directed molecular imprinting is a viable method of creating robust, enantioselective catalytic silica particles. To our knowledge, this is the first example of forming catalytic silica particles by imprinting reactive sites exclusively into the surface of the particle. Our efforts represent an alternative to conventional molecular imprinting techniques. Surface-imprinting was clearly demonstrated by the effect of increasing the amount of acylated imprint molecule, N-decyl-L-phenylalanine-2-aminopyridine, on initial rate and $K_1/K_2$ (measure of catalytic efficiency per amount of surface-imprinted silica) values of DL-BAPNA amide hydrolysis (Tables 2 and 3). As the amount of N-decyl-L-phenylalanine-2-aminopyridine used to surface-imprint the silica particles increased, the catalytic efficiency of the particles increased. For this to happen, the imprint molecule must act as a surfactant headgroup that is positioned at the surfactant-water interface of the microemulsion to create the catalytic site. In addition, the observation of enantioselectivity (Table 4) strongly suggests that defined, surface-imprinted catalytic sites have been formed using template-directed molecular imprinting.

While both the imprint molecule and the functionalized amine and carboxylate silanes have a positive effect on the hydrolysis rates obtained, it is their combination that produces the best catalytic particles. The importance of the fimctionalized silanes can be seen from the data in Tables 1 and 2. The initial rates for particles imprinted in the absence of functionalized silanes indicate that imprint molecule shape has only limited impact on the efficacy of the molecular recognition site created. Incorporation of functionalized silanes into the particles reveals two important features of this imprinting method: 1) The lack of a rate enhancement for the non-acylated chymotrypsin TSA in the presence of silanes as compared to the rate enhancement observed for the acylated imprint molecules strongly suggests that acylation aids in effectively positioning the imprint molecule at the surfactant-water interface at which the particle forms; 2) the presence of complementary hydrogen-bonding silanes at the surfactant-water interface as the silica particle is forming is essential to forming reactive catalytic imprints. The results suggest that some or all of the surface amine and carboxylate groups, along with the surface hydroxyl groups of the silica particles, are capable of interacting with the substrate amide carbonyl group to enhance its reactivity. The observation that shape of the imprinted cavity alone does not produce effective imprinted catalytic sites within polymers has been previously reported.

Results obtained to determine the effect of increasing the wt. % of the functionalized silanes in the imprinted silica particles reveal that doing so results in a decrease in rate of amide hydrolysis (Table 2). This is probably due to hydrogen bonding between the functionalized silanes leaving fewer available for interaction with the substrate. From previous reports, it is known that surface functional groups will form hydrogen bonds with the native surface hydroxyl groups of the silica particles as well as with each other, thereby decreasing their basicity and ability to hydrogen bond to other molecules.

The most interesting kinetic data deal with the specificity observed for amide hydrolysis catalyzed by silica particles with surfaces imprinted with N-decyl-L-phenylalanine-2-aminopyridine. The surface imprinted particles have selectivity for the trypsin substrate over the chymotrypsin substrate even though imprinting was done with the chymotrypsin TSA (Table 4). The magnitude of the kinetic constants obtained for the hydrolysis of L-, D-, and DL-BAPNA catalyzed by the surface-imprinted silica particles are consistent with a D-enantioselective mode ofhydrolysis. In fact, the hydrolysis of D-BAPNA catalyzed by the surface-imprinted particles is 10 times faster ($K_1$) and 39 times more efficient ($K_1/K_2$) than the hydrolysis of L-BAPNA catalyzed by the particles. Based on the observed enantioselectivity, at least three of the groups surrounding the chiral methine carbon of D-BAPNA must be bound to the catalytic site surface-imprinted silica particle. This reversal of stereoselectivity has been observed to occur for substrate hydrolysis or transformation catalyzed by enzymes such as -chymotrypsin, lipase, peptidases and -lactamases. The enantioselectivity of the hydrolysis strongly suggests that molecular structure affected substrate packing within the catalytic site. Substrate substituent effects have been observed to have a major factor influencing enzyme enantioselectivity. Since the substrate is structurally different than the imprinting molecule, the observed enantiopreference of the amide hydrolysis catalyzed by the surface-imprinted silica particles may arise because the D-BAPNA packs more readily into the imprinted catalytic site than L-BAPNA.

Obviously, many modifications and variations of the present invention are possible in light of the above teachings. It is therefore to be understood that, within the scope of the appended claims, the invention may be practiced otherwise than as specifically described.

What is claimed is:

1. A method for making a material having a molecularly imprinted surface, the method comprising the steps of
   (a) providing a surfactant coupled to an imprint group,
   (b) combining the surfactant with a solvent to form a mixture and maintaining the mixture so that molecules of the surfactant self-assemble to form at least one supramolecular structure having a surface and wherein the imprint groups are exposed on the surface,
   (c) combining the mixture from step (b) with at least one reactive monomer so that the supramolecular structure serves as a template for the organizing of molecules of the reactive monomer along the surface of the supramolecular structure and around the exposed imprint groups, (d) maintaining the mixture from step (c) so that the reactive monomers react with each other to form a solid structure having a surface topography complementary to the surface topography of the supramolecular structure and having indentations complementary to the shape of the exposed imprint groups, and (e) removing the supramolecular structure from the solid structure.

2. A method for making a material having a molecularly imprinted surface, the method comprising the steps of (a) providing a surfactant compound having a headgroup portion, wherein the headgroup portion comprises an imprint group, (b) combining the surfactant compound, a solvent and at least one reactive monomer to form a mixture and maintaining the mixture so that molecules of the surfactant compound self-assemble to form at least one supramolecular structure having a surface wherein the imprint groups are exposed on the surface and so that the supramolecular structure serves as a template wherein the molecules of the reactive monomer self-organize along the surface of the supramolecular structure and around the exposed imprint groups, (c) maintaining the mixture from step (b) so that the reactive monomers react with each other to form a solid structure having a surface topography complementary to the surface topography of the supramolecular structure having indentations complementary to the shape of the exposed imprint groups, and (d) removing the supramolecular structure from the solid structure.

3. The method of claim 2 wherein the surfactant compound is a compound that is made by the steps of providing a hydrophilic imprint compound and acylating the hydrophilic imprint compound to create an amphiphilic surfactant compound.

4. The method of claim 2 wherein the supramolecular structure is in the form of a micelle, reverse micelle, vesicle, bicontinuous cubic phase structure, hexagonal phase structure, or tubule.

5. The method of claim 2 wherein the reactive monomer is an organic polymer precursor.

6. The method of claim 2 wherein the reactive monomer is selected from the group consisting of acrylate, methyl methacrylate, olefins, pyrrole, saccharides, silanes, styrene, isocyanates, vinyl acetate, vinyl chloride and combinations thereof.

7. The method of claim 2 wherein the reactive monomer is an inorganic oxide precursor.

8. The method of claim 2 wherein the reactive monomer is selected from the group consisting of tetraethoxysilane, tetramethoxysilane, tetrabutoxysilane, tetramethoxygermnane, tetraisoprpoxygermnane, tetraethoxygermane, tetrabutoxygermane, aluminum n-butoxide, aluminum isoproxide, titanium ethoxide, titanium diisopropoxide (bis-2,4-pentanedionate), titanium methyl phenoxide, vanadium triisopropoxide oxide, vanadium tri-n-propoxide, zirconium n-butoxide, zirconium n-propoxide and combinations thereof.

9. The method of claim 2 wherein the reactive monomer is a silicon oxide precursor.

10. The method of claim 2 wherein the reactive monomer is an alkoxysilane.

11. The method of claim 2 wherein the mixture of step (b) includes a non-functionalized reactive monomer, a reactive monomer having an amine functional group, a reactive monomer having a carboxyl functional group and reactive monomer having a dihydroimidazole functional group.

12. The method of claim 2 wherein the mixture of step (b) includes a non-functionalized reactive monomer and at least one reactive monomer having a functional moiety selected from group consisting of primary amines, secondary amines, tertiary amines, quaternary amines, hydroxyl, carboxylate, sulfhydryl, amino acids, metal chelates, ureido, urea, thiourea, amidine, methyl, phenyl, fluorocarbons, nucleotides, phosphonucleotides, phosphates, saccharides and combinations thereof.

13. The method of claim 2 wherein the mixture of step (b) includes at least one additional surfactant.

14. The method of claim 2 wherein, in step (b), the surfactant and the solvent are combined first and the mixture of the surfactant and solvent is maintained so that molecules of the surfactant compound self-assemble to form at least one supramolecular structure having exposed imprint groups and wherein subsequently, the reactive monomer is added to the mixture.

15. The method of claim 2 wherein the imprint group includes at least one functional moiety, wherein the mixture of claim (b) includes at least one reactive monomer that has a complementary functional moiety that binds reversibly to at least one functional moiety of the imprint group, wherein, in step (c), as molecules of the reactive monomers self-organize along the surface of the supramolecular structure and around the exposed imprint groups, the molecules of the reactive monomers having complementary functional moieties become spatially distributed with respect to molecules of the imprint group so that the complementary functional moieties of the reactive monomers bind reversibly to the functional moieties of molecules of the imprint group, and wherein, in the solid structure formed in step (d), the spatial distribution of the reactive monomers having complementary functional moieties is retained.

* * * * *